Nov. 13, 1962　　　D. ENGELSMANN　　　3,063,352
AUTOMATIC CAMERA
Filed Dec. 15, 1959　　　　　　　　　　　3 Sheets-Sheet 1

INVENTOR.
DIETER ENGELSMANN
BY
Michael S. Striker
Aty

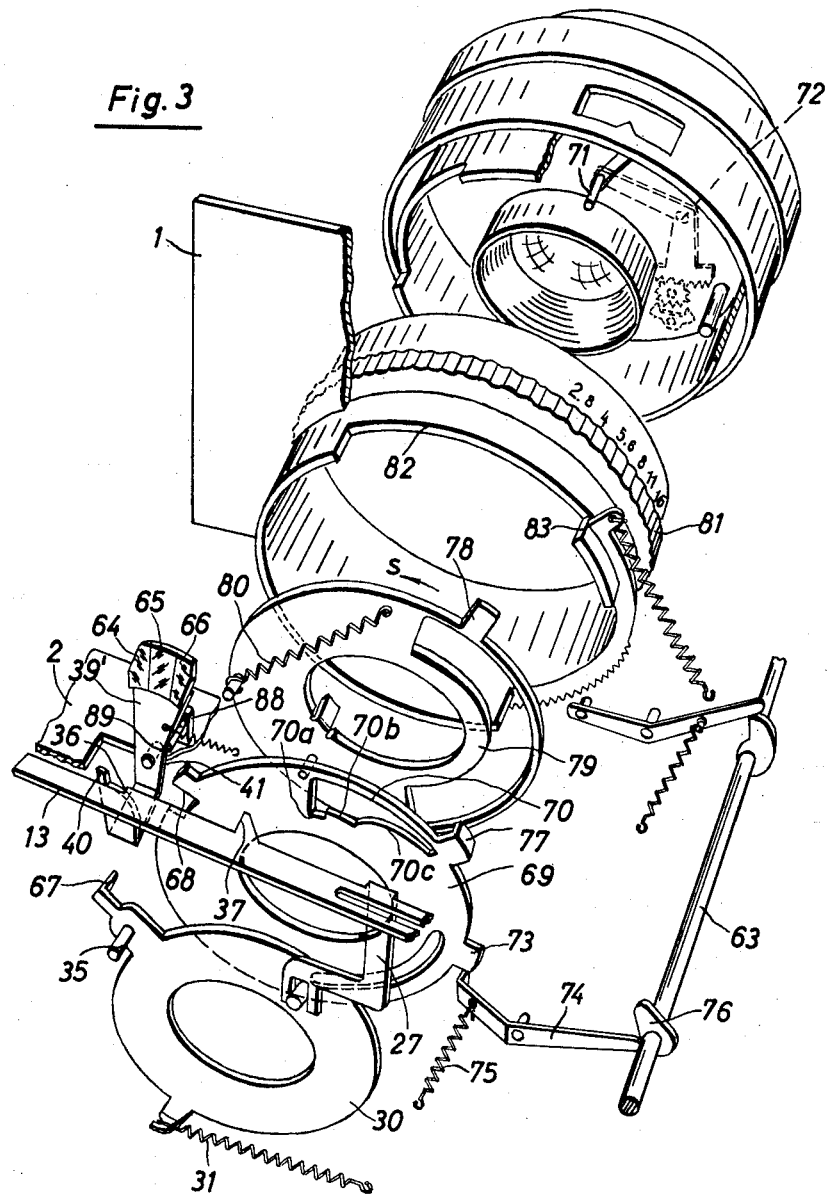

Nov. 13, 1962 D. ENGELSMANN 3,063,352
AUTOMATIC CAMERA
Filed Dec. 15, 1959 3 Sheets-Sheet 3
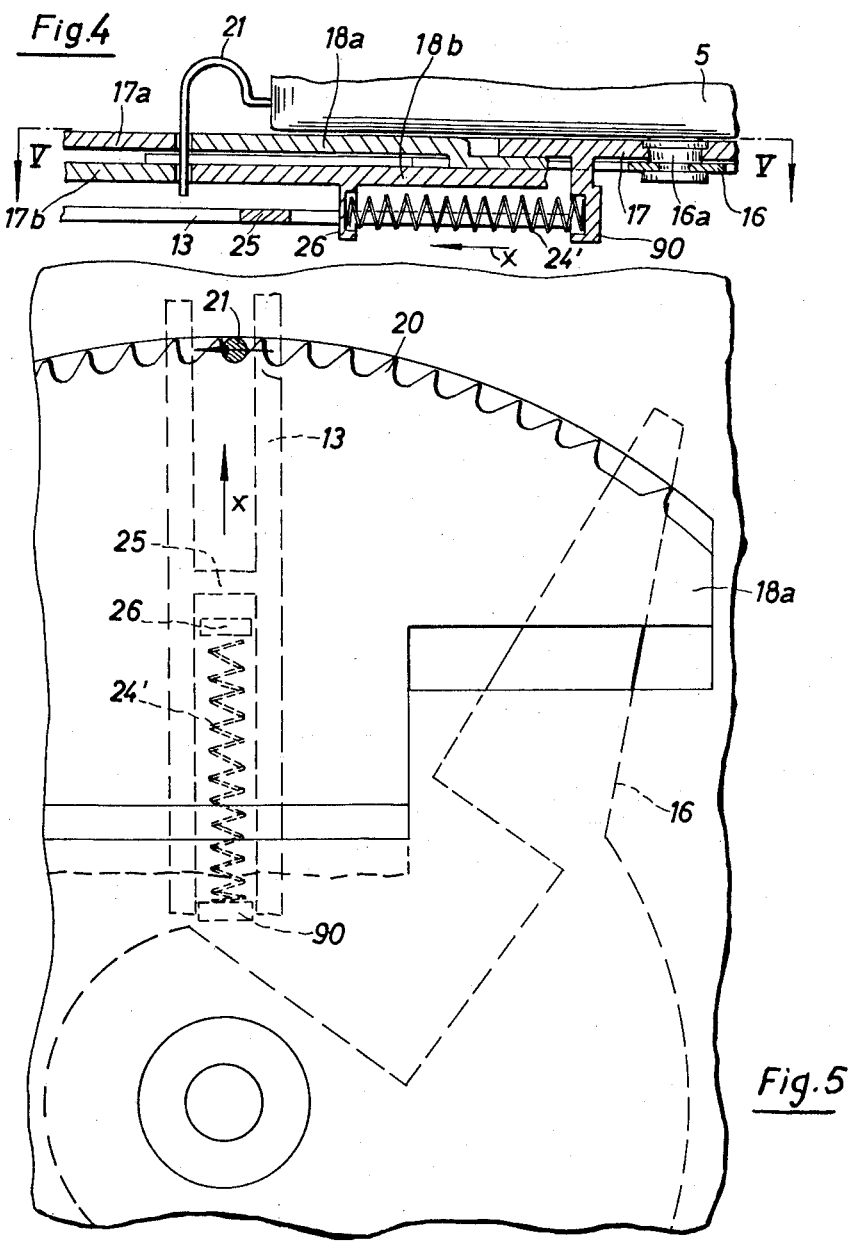
INVENTOR.
DIETER ENGELSMANN
BY
Michael S. Striker
Attorney

United States Patent Office 3,063,352
Patented Nov. 13, 1962

3,063,352
AUTOMATIC CAMERA
Dieter Engelsmann, Munich, Germany, assignor to Agfa
Aktiengesellschaft, Leverkusen-Bayerwerk, Germany
Filed Dec. 15, 1959, Ser. No. 859,738
Claims priority, application Germany Dec. 19, 1958
15 Claims. (Cl. 95—10)

The present invention relates to cameras.

More particularly, the present invention relates to still cameras which are provided with light meters for determining the light conditions as well as with mechanism for automatically setting the cameras so as to make proper exposures.

With cameras of this type there are lighting conditions at which, if the camera should be automatically operated, either under exposures or over exposures will be made, and at the present time there has been no satisfactory solution to the problem of indicating to the operator when these unfavorable lighting conditions prevail. For example, in order to indicate these unfavorable lighting conditions the light meter must be located at an unfavorable position in the camera which is structurally unsuitable for the location of the light meter but which nevertheless is used as the location of the light meter in order to give an indication to the operator of the unfavorable lighting conditions, or if the light meter is located in the best possible position then the indicator structure which indicates to the operator the unfavorable lighting conditions is unfavorably situated so as to make it extremely inconvenient for the operator to see the indication of the suitability of the lighting conditions for an exposure. Moreover, with conventional structure of this type the indicator structure is suitable only for indicating under exposures or over exposures and cannot serve any other purpose.

One of the objects of the present invention is to provide a camera of the above type which enables the light meter to be located in the best possible position with its axis extending vertically while at the same time providing an extremely convenient indication to the operator of the suitability of the lighting conditions for making an exposure.

Another object of the present invention is to provide an exceedingly simple structure wherein part of the structure for actuating the indicator of the lighting conditions also participates in the automatic setting of the camera.

It is also an object of the present invention to provide an indicator which will indicate not only the suitability of the lighting conditions for an exposure but which will also indicate such information as whether the camera is set for manual operation, automatic operation, or flash operation, for example.

An additional object of the present invention is to provide an indicator structure which will reliably prevent two indications from being simultaneously given to the operator.

It is also an object of the invention to provide a structure capable of automatically operating the camera while at the same time permitting manual operation of the camera without interference with the automatic operation of the camera or without the automatic structure operating with the manual operation of the camera.

With the above objects in view the invention includes in a camera a support means and a control slide supported by the support means for shifting movement in a given direction. A light-responsive means cooperates with the control slide for shifting the latter in the said direction through a distance which is determined by the amount of light received by the light-responsive means, and an indicator means is located in the path of movement of the control slide to be moved by the latter to a position which will indicate the lighting conditions. This control slide additionally cooperates with a structure for automatically setting the exposure time and exposure aperture of the camera, and in accordance with the invention the control slide is connected to the exposure time setting means of the camera for actuating the latter while a coupling means transfers the movement of the exposure time setting means to the exposure aperture setting means of the camera in such a way that this aperture setting means of the camera can also be manually set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a perspective exploded view of another embodiment of a structure according to the present invention; and FIG. 4 is a sectional elevation on an enlarged scale of part of the light-responsive means of FIG. 1, FIG. 4 differing from the embodiment of FIGS. 1 and 2 only with respect to a spring means which actuates a movable clamping jaw.

FIG. 5 is a fragmentary partly sectional plan view taken along line V—V of FIG. 4 in the direction of the arrows.

Figure 1:
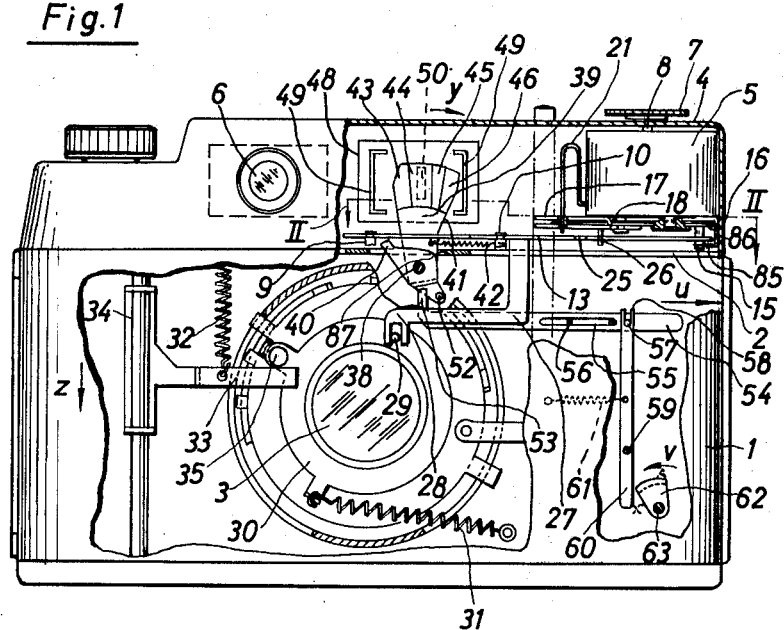
FIG. 1 is an elevation of a camera according to the invention as seen from the rear with parts of the camera broken away so as to illustrate in the clearest possible manner the structure of the invention.

Referring now to the drawings and to FIG. 1 in particular, it will be seen that the camera illustrated therein includes a support means made up in part of the housing 1 of the camera, this housing 1 having an upper wall 2 and carrying the objective 3. Over the wall 2 of the housing 1 is located the upper part 4 of the camera which also forms part of the support means of the camera, and this upper part 4 of the camera serves as a housing for a light-responsive means which includes the galvanometer 5 which serves as a light meter and which is actuated by light received in a well known manner from an unillustrated photoelectric cell. The upper part 4 of the camera also includes a conventional viewfinder part of which is constituted by the ocular 6. In order to set into the camera the speed of the particular film which is exposed in the camera a knob 7 is provided over the upper part 4 of the camera, this knob 7 being fixed to a pin 8 which extends through the top wall of the part 4 and which is connected with the light meter 5 so as to turn the latter about its axis to an angular position which will compensate for the particular speed of the film which happens to be placed in the camera, the upper wall of the part 4 being provided with a suitable scale of exposure indexes cooperating with an index on the knob 7 so as to enable theoperator to set the light meter 5 at a particular angular position which will take into account the exposure index of the film which is used in the camera.

The support means includes in addition to the upper wall 2 of the housing 1 a pair of pins 9 and 10 which are fixed to and extended upwardly from the wall 2 and which are provided with portions of reduced diameter respectively extending through elongated slots 11 and 12 formed in an elongated control slide 13, so that in this way the control slide 13 rests on the pins 9 and 10 to be supported thereby for shifting the movement to the right and left, as viewed in FIG. 1, in a direction perpendicular to the optical axis, the portions of reduced diameter of the pins 9 and 10 extending through the slots 11 and 12 to guide the slide 13 for movement in this direction. The tops of the pins 9 and 10 may be provided with threaded bores receiving screws whose head ends engage the upper face of the slide 13 without pressing the latter downwardly against the shoulders of the pins 9 and 10 so that in this way the slide 13 is guided while at the same time incapable of movement axially with respect to the pins 9 and 10. It will be noted that the slide 13 extends beneath the meter 5 of the light-responsive means.

As is apparent from FIG. 2 the right end of the slide 13, as viewed in FIG. 2, has a lateral projection 14 located in the path of movement of a pin 15 which is connected to one end of the spring 85 whose opposite end is connected to a lug 86 of a stationary plate 17 described below. Thus, the spring 85 urges the pin 15 toward and into engagement with the lateral projection 14 of the slide 13. This pin 15 is fixed to a follower 16 which is pivotally carried by the stationary plate 17. As is most clearly illustrated in FIG. 4 the stationary plate 47 carries a pivot pin 16a which serves to pivotally support the follower 16. The stationary wall 17 which supports the meter 5 is itself fixedly supported in an unillustrated manner by the top wall 2 of the camera housing. As is particularly apparent from FIG. 4, the stationary wall 17 is provided with a cutout in which a plate 18a of a movable jaw 18 of a clamping means is movable, the left end portion 17a of the plate 17 forming the upper wall of a stationary jaw of the clamping means. This clamping means serves to clamp the pointer 21 of the meter 5 in a given angular position, this pointer 21 having at its left, as viewed in FIGS. 1 and 4, a downwardly extending vertical portion which is adapted to be clamped by the clamping means. This clamping means includes a lower plate 17b fixed in an unillustrated manner to the upper plate 17a in parallel relation to the latter but spaced below the same, and the movable jaw 18 includes in addition to the upper plate 18a the lower plate 18b which is fixed to the upper plate 18a at the right portion of the latter, as viewed in FIG. 4, which is stepped downwardly and which extends beneath a portion of the plate 17. Any suitable pin-and-slot connections or the like may be provided between the stationary plate 17 and the movable jaws 18 to support the latter for movement back and forth to the right and left, as viewed in FIGS. 2 and 4, and as is particularly apparent from FIG. 2 the side edges of the jaw 18 are guided by the side edges of the cutout formed in the plate 17. As is particularly apparent from FIG. 4, the jaws 17 and 18 are each made up of a pair of plates which define between themselves a given space with this space of each jaw being located at the same elevation and the follower 16 is movable in this space between elements 17a and 17b of the jaw 17 as well as between elements 18a and 18b of the jaw 18.

Figure 2:
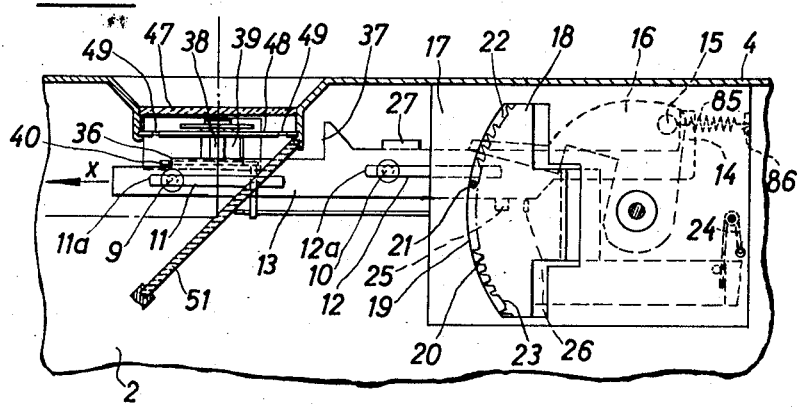
FIG. 2 is a fragmentary partly sectional plan view taken along line II—II of FIG. 1 in the direction of the arrow.

Referring to FIG. 2 it will be seen that the pointer 21 moves along an arc of a circle along which an arcuate edge of the cutout formed in plate 17 extends, and the right edges of the element 17a and 17b extend along the arc shown at the left end of the cutout illustrated in FIG. 2 so as to form a stationary edge of the stationary clamping jaw. The elements 18a and 18b are provided with teeth 20 shown in FIG. 2, and in its rest position the movable jaw 18 is displaced to the right beyond the position thereof illustrated in FIGS. 2 and 4. In the embodiment illustrated in FIG. 2 a spring 24 cooperates with a pin fixed to the movable jaw 18 to urge the latter to the left to a clamping position, while in the embodiment of FIG. 4 a spring 24′ engages a projection 90 of the plate 17 and a projection 26 of the plate 18 to urge the latter to the left to its clamping position. The teeth 20 are each provided with a flattened outer tip and a substantially trapezoidal configuration with the upper edge of each tooth 20, as viewed in FIG. 2, extending perpendicularly with respect to the tangent to the circle along which the pointer 21 moves at the intersection between this circle and the upper edge of each tooth 20, as viewed in FIG. 2. Moreover, as is apparent from FIG. 2, the pointer 21 has a circular cross-section at its portion which is clamped by the clamp means 17, 18, and a diameter of this circular portion is greater than the distance between the tip and root of each tooth 20 although each tooth 20 has between its tip and root a dimension greater than one-half the diameter of the cross-section of the pointer 21. In this way an exceedingly efficient and reliable clamping of the pointer 21 is provided without transmitting stresses undesirably to the meter 5 itself. When the movable jaw 18 is in its rest position displaced to the right beyond the position thereof shown in FIG. 2 the jaw 18 defines with the jaw 17 an arcuate slot in which the pointer 21 can freely move. As is apparent from FIG. 2, at the ends 22 and 23 of the series of teeth 20 of the movable jaw 18 the spaces between the last pair of teeth at each end 22 and 23 are respectively greater than the spaces between the remainder of the teeth of the series of teeth 20. The control slide 13 has a projection 25 which engages the projection 26 of the plate 18 to urge the latter to the right in opposition to the spring 24, 24′ so as to maintain the movable jaw 18 in its rest position.

The control slide 13 includes a downwardly directed stepped arm 28 terminating in a bifurcated end 28 which receives the pin 29 which is fixed to the adjusting ring 30 which is supported for turning movement around the optical axis by the lens tube of the objective 3. This adjusting ring 30 cooperates with the exposure time ring so as to actuate the latter, and the exposure time setting ring actuates the aperture setting ring. One end of a spring 31 (FIG. 1) is fixed to the ring 30 while the other end of this spring 31 is fixed to a stationary pin of the housing 1, and thus the spring 31 urges the ring 30 in a counterclockwise direction, as viewed in FIG. 1, so as to tend to urge the control slide 13 to the left, as viewed in FIG. 1. Thus, referring to FIG. 2, it will be seen that the spring 31 tends to urge the control slide 13 in the direction of the arrow x. However, in the rest position of the parts a spring 32 (FIG. 1) which is stronger than the spring 31 maintains the control slide 13 in a rest position where the pins 9 and 10 respectively engage the ends 11a and 12a of the slots 11 and 12 of the control slide 13, this spring 32 acting in opposition to the spring 31 as well as the spring 24 of FIG. 2 and 24′ of FIG. 4, so that through this spring 32 the parts are maintained in their rest position. The spring 32 is connected at its bottom end to an arm 33 of a manually operable member 34 guided for vertical movement by the rod shown in FIG. 1 and having an exterior finger piece accessible to the operator so that when the operator wishes to operate the camera the member 34 is manually moved in the direction of the arrow z shown in FIG. 1 in opposition to the spring 32. However, when the parts are at rest the spring 32, whose top end is connected to the top wall 2 of the housing 1, for example, urges the element 34 up to the position as illustrated in FIG. 1, and the arm 33 cooperates with a pin 35 fixed to the adjusting ring 30 so as to maintain this adjusting ring 30 in the position illustrated in FIG. 1 in opposition to the spring 31 and the spring 24 or 24′.

As may be seen from FIG. 2, the control slide 13 is provided at its longitudinal portion which is guided for movement by the pins 9 and 10 with a pair of projecting edge portions 36 and 37 which are displaced with respect to each other both longitudinally and laterally along the elongated portion of the control slide 13 which is visible in FIG. 2. The structure of the invention includes an indicating means for indicating to the operator such information as whether or not the lighting conditions are favorable for an exposure, and this indicator means is actuated by the projecting edge portions 36 and 37 during movement of the control slide 13 in the direction of the arrow x of FIG. 2. This indicator means in the illustrated examples includes a carrier 39 which is turnably supported by a stationary pivot pin 38 for turning movement about an axis which extends transversely with respect to the direction of movement of the control slide 13, the stationary pin 38 being fixedly mounted on a stationary part of the support means formed by the housing 1, 2. The carrier 39 has a projection 40 located in the path of movement of the projecting edge portion 36 of the control slide 13, and the carrier 39 has an additional edge portion 41 located in the path of movement of the projecting edge 37 of the control slide 13. In the illustrated example the carrier 39 is of U-shaped configuration and one of its legs terminates in the stop 40 while the other of its legs has an edge which forms the edge portion 41. A spring 42 is connected at one end to the carrier 39 to urge the latter in a clockwise direction, as viewed in FIG. 1, to a rest position where the carrier 39 engages the right end 87 of a slot formed in the top wall of the housing 1, this carrier 39 extending through the slot of the wall 2, and thus the edge 87 of this slot limits the clockwise turning of the carrier 39 by the spring 42 which is connected at one end to the carrier 39 and its opposite end to a stationary pin such as the pin 10, for example. Thus, the spring 42 urges the carrier 39 to turn in the direction of the arrow y of FIG. 1.

The indicator means includes also a plurality of indicating portions 43–46 in the example of FIGS. 1 and 2, these indicating portions 43–46 being fixed to and extending upwardly from the carrier 39. The several indicating portions 43–46 are made of translucent material of different colors. For example, the indicating portions 43 and 45 may be red, while the indicating portion 44 can be green, and the indicating portion 46 can be yellow.

As is shown most clearly in FIG. 2, the front wall of the camera is provided with a window 47 through which light passes in order to reach a frame 48 located behind the window 47. This frame 48 is provided with cutouts 49 and having the configuration illustrated in FIG. 1, and thus the light which comes through the window 47 will pass through the cutouts 49, and a reflector 51 shown in FIG. 2 is provided behind the frame 48 to project into the viewfinder an image of the cutouts 49, these cutouts thus forming limits for framing the image seen in the viewfinder. This frame 48 is also provided with an aperture 50 smaller than any of the indicator portions 43–46, and as is clearly evident from FIG. 2 the indicator portions 43–46 are located between the window 47 and the aperture 50 so that the light which passes through the window 47 will then pass through one of the indicator portions 43–46 before reaching the aperture 50. With this construction the reflector 51 will also project into the viewfinder an image of the aperture 50 having the color of the indicator portion which happens to be in register with the aperture 50. The image of the cutouts of the frame 48 are seen in the viewfinder field in a well-known manner. Thus, the reflector 51 projects the images onto a semi-transparent reflector located along the optical axis of the viewfinder ocular 6 so that when the operator looks through the ocular 6 there will be seen not only an image of the subject to be photographed but also the images of the cutouts of the frame 48 projected onto the viewing field of the viewfinder.

Referring to FIG. 1 it will be seen that the carrier 39 is provided below the pivot pin 38 with a pin 52 extending parallel to the pivot pin 38. This pin 52 is located at the elevation of an upwardly directed end 53 of a second elongated slide 54 formed with an elongated slot 55 into which stationary pins 56 extend so as to guide the slide 54 for movement to the left and right, as viewed in FIG. 1. The slide 54 carries a pin 57 received in the bifurcated end 58 of a lever 60 which is pivotally carried by the stationary pivot pin 59, and a spring 61 is connected at one end to a stationary pin and at the opposite end to the lever 60 to urge the latter in a counterclockwise direction, as viewed in FIG. 1, so that the lower end of the lever 60 will be maintained in engagement with a cam 62 carried by a shaft 63 which is turnably supported in the camera and which is turned by the operator to a selected angular position in order to set the camera for automatic or manual operation, and also, as pointed out below, for flash operation, as desired.

FIGS. 1 and 2 show the camera set for automatic operation. If an exposure is to be made with the camera in this position, then the operator simply moves the element 34 downwardly in the direction of the arrow z shown in FIG. 1 so as to move the arm 33 down in opposition to the spring 32. As a result the adjusting ring 30 is released to the force of the tensioned spring 31 which now turns the adjusting ring 30 in a counterclockwise direction, as viewed in FIG. 1, and thus the adjusting ring 30 will act through the pin 29 on the arm 27 of the control slide 13 to shift the latter in the direction of the arrow x of FIG. 2. When the control slide 13 moves in this way the projection 25 thereof moves to the left away from the downwardly directed projection 26 of the movable jaw 18 of the clamping means, and thus the spring 24 in the case of FIG. 2 and 24′ in the case of FIG. 4 can now move the clamping jaw 18 into its clamping position. As a result the pointer 21 is fixed in a given angular position which is indicative of lighting conditions since the angular position of the pointer 21 at any given instant is determined by the amount of light reaching the unillustrated photo cell which actuates the galvanometer 5. During this time, which is to say when the control slide 13 is in its rest position, the spring 42 locates the carrier 39 against the stop edge 87 so as to locate the indicator portion 43 in register with the cutout 50, and thus when the operator looks through the ocular 6 of the viewfinder the image of the aperture 50 will be seen colored red, and the operator will therefore know that the exposure should not be made. During the movement of the control slide 13 in the direction of the arrow x of FIG. 2 the projecting edge 36 of the control slide 13 will engage the projection 40 of the carrier 39 so as to turn the latter in opposition to the spring 42 in a counterclockwise direction, as viewed in FIG. 1. Moreover, during the movement of the control slide 13 in the direction of the arrow x of FIG. 2 the end 14 of the control slide 13 engages the pin 15 of the follower 16 to turn the latter in opposition to the spring 85 in a counterclockwise direction, as viewed in FIG. 2, and the control slide 13 continues to move to the left, as viewed in FIG. 2, until the follower 16 engages the clamped pointer 21 so that the follower 16 can turn no further in a counterclockwise direction, as viewed in FIG. 2, and as a result the control slide 13 is also prevented from moving further so that in this way the distance through which the control slide 13 moves in the direction determined by the pins 9 and 10 and the slots 11 and 12 is indicative of the lighting conditions. It will be noted that with the above described structure of the teeth 20 and the clamping jaws 17 and 18 of the clamping means when the follower 16 engages the pointer 21 it will do so in a direction perpendicular to the axis of the portion of the clamped pointer at a point between a pair of clamped portions of the pointer so that in this way no stresses are undesirably transmitted back to the galvanometer 5. Of course, the movement of the control slide 13 is derived from the force of the spring 31, and during the time that the control slide 13 moves in the direction of the arrow x of FIG. 2 the adjusting ring 30 is turning and through its connection with the aperture and exposure time adjusting rings the aperture and exposure time of the camera are set automatically to give a proper exposure according to the position of the control slide 13, and thus according to the particular lighting conditions since the position of the control slide 13 is indicative of the lighting conditions, as pointed out above. The range of exposures and exposure times as well as the range of film speeds capable of being used with the camera may be any suitable range. Thus, for example, the camera may be constructed so as to have aperture stops from 3.9 to 22, exposure times from $\frac{1}{30}$ to $\frac{1}{250}$ sec., and the range of film speeds may be from 10 to 800 ASA.

Assuming that there is an average brightness, then the pointer 21 will be clamped somewhere around the central portion of the jaws 17 and 18, and in this event the turning of the indicator 39 by the edge 36 of the control slide 13 will turn the indicator 39 through such an angle that the indicator portion 43 moves out of register with the aperture 50 in a direction opposite to the arrow $y$ of FIG. 1 and the green indicator portion 44 is in register with the aperture 50 so that the operator now sees the image of the aperture 50 colored green in the field of the viewfinder and this is an indication to the operator that the lighting conditions are favorable for an exposure and the operator can then go ahead and release the shutter so as to make the exposure. The parts are shown in this position with the indicator portion 44 in register with the aperture 50 in FIGS. 1 and 2.

If it should happen that the light is extremely bright and the galvanometer 5 has been turned by the knob 7 to an angular position which takes into account a film of high speed, then in this event toward the end of the movement of the control slide 13 in the direction of the arrow $x$ of FIG. 2 the projecting edge portion 37 of the control slide 13 will engage the edge 41 of the carrier 39 and turn the latter to such an angle that the indicator portion 45 comes in register with the aperture 50, and the operator now sees the image of the aperture 50 colored red when looking through the viewfinder, and as a result the operator knows that the lighting conditions are not proper for an exposure.

In order to prevent a pair of indicator portions from being simultaneously visible at their adjoining edges through the aperture 50 and thus in the field of the viewfinder, the series of teeth 20 are provided at the ends of the series with the larger gaps 22 and 23 between the last two teeth, as pointed out above. Thus, in order to prevent the indicator portions 44 and 45 from both being simultaneously visible the gap 23 is provided. As a result of this arrangement when there is a border line situation between lighting conditions favorable for an exposure and lighting conditions which will give an over exposure, the spring 31 will act on the arm 27 of the control slide 13 and through the latter on the follower 16 to move the latter with the pointer 21 all the way up to the last tooth of the series 20 beyond the point where the boundary line between the indicator portions 44 and 45 is in register with the aperture 50, so that in this way in these border line situations the indicator portion 45 comes into register with the aperture 50 and the operator simply does not make an exposure.

In order to prevent also an indication of the junction between the indicator portions 43 and 44 from remaining in register with the aperture 50, the gap 22 is provided so that in a situation where the amount of light available is relatively small and there is a border line situation between too little light for proper exposure and just enough light for proper exposure the spring 31 will act through the slide 13 and follower 16 on the pointer 21 which now is in the gap 22 to move the latter to the point where the indicator portion 44 will be visible so that in this case an exposure is made and the operator is never given a confusing double indication where both the red of the indicating portion 43 and the green of the indicator portion 44 are simultaneously visible in the viewing field. It is to be noted that the larger gaps 22 and 23 at the end of the series of teeth 20 makes it much simpler and easier to adjust the carrier 39.

Through a structure which is not illustrated since it forms no part of the invention, the operator can manually turn the shaft 63 shown at the lower right of FIG. 1, in the direction of the arrow $v$ in order to set the camera for manual operation, and in this event the cam 62 acts on the lever 60 to turn the latter in a clockwise direction as viewed in FIG. 1, in opposition to the spring 61. This turning of the lever 60 acts through the pin 57 on the slide 54 to move the latter in the direction of the arrow $u$, and as a result the left upwardly directed end 53 of the slide 54 engages the pin 52 to turn the carrier 39 of the indicator means in a direction opposite to the arrow $y$ through an angle sufficient to locate the indicator portion 46 in register with the aperture 50, and at this time the operator will see in the viewing field the image of aperture 50 colored yellow, and thus the operator will know that the camera is set for manual operation. When the shaft 63 is turned by the operator back to the position shown in FIG. 1 the spring 61 will act through the lever 60 on the slide 54 to again locate the latter in the position illustrated in FIG. 1 where any of the indicator portions 43–45 can be located in register with the aperture 50 without any engagement between the pin 52 and the end 53 of the slide 54.

In cameras which are provided with flash operation as well as hand or automatic operation it is possible to provide the cam 62 with an additional stepped portion which will turn the lever 60 further when the shaft 63 is turned by the operator to a further angular position indicative of setting of the camera for flash operation, and with this construction the carrier 39 will be turned in a direction opposite to the arrow $y$ of FIG. 1 and through an angle which will move the indicator portion 46 to the left, as viewed in FIG. 1, beyond the aperture 50, and in this event an additional indicator portion can be carried by the carrier 39 to the right of the indicator portion 46 to come into register with the aperture 50 at this time so as to indicate that the camera is now set for flash operation, and of course such an additional indicator portion can have any desired color different from the colors of the indicator portions 43–46. For example, a blue translucent indicator portion may be used for this purpose.

FIG. 3 illustrates a simplified embodiment of the structure of the invention. Thus, as may be seen from FIG. 3 the carrier 39' of the indicator means carries only three indicator portions 64–66 which are successively placed in register with the unillustrated aperture 50 during turning of the carrier 39' first by the projecting edge portion 36 and then by the projecting edge portion 37 of the control slide 13, as described above. The control slide 13 and the parts associated therewith have in the embodiment of FIG. 3 the same structure as that described above in connection with the embodiment of FIGS. 1 and 2. Thus, the arm 27 cooperates with the adjusting ring 30 in the manner described above. This adjusting ring 30 is provided with a projection 67 which extends into a cutout 68 of the exposure time setting ring 69, so that in this way the turning of the ring 30 is transmitted to the ring 69 to set the exposure time in accordance with the angular position of the rings 30 and 69.

The flat ring 69 is provided with a camming edge 70 which cooperates with a pin 71 for adjusting the timing mechanism so as to provide the exposure time which is determined by the angular position of the ring 69. In the illustrated example this camming edge 70 is provided with three camming portions 70a, 70b, and 70c. If the ring 69 is in an angular position which locates the camming edge 70a in engagement with the pin 71 then the shutter is in the B position where the length of exposure time is determined solely by the length of time that the operator maintains the shutter release plunger pressed, as is well known. When the camming edge portion 70b is in engagement with the pin 71 then the exposure time will remain at a given value throughout the entire length of the camming edge portion 70b which extends along a circle whose center is in the optical axis. On the other hand, the camming edge portion 70c is curved in such a way that the exposure time continuously changes during turning of the camming edge 70c with respect to the pin 71 which engages the camming edge 70c at this time. The exposure time provided by the intermediate camming edge portion 70b is an exposure time suitable for flash operation such as 1/50 or 1/60 of a second, for example.

The exposure time setting ring 69 additionally includes a control projection 73 which cooperates with an end of a lever 74 which is pivotally supported intermediate its ends on a stationary pin carried by the support means of the camera and which is urged in a counterclockwise direction, as viewed in FIG. 3 by a spring 75 connected at one end to the lever 74 to the left of the pivot axis thereof, as viewed in FIG. 3, and at its other end to a stationary part of the camera. The spring 75 thus maintains the right end of the lever 74, as viewed in FIG. 3, in engagement with a cam 76 which is carried by the manually turnable shaft 63. Furthermore the exposure time setting ring is provided with a projection 77 terminating in an axially extending portion which extends through the plane in which the aperture setting ring 79 is located when the ring 69 is turned together with the ring 30 by the spring 31 in the direction of the arrow s the projection 77 will engage the radial projection 78 of the aperture setting ring 79 to turn this aperture setting ring and thus the exposure aperture will also be set through turning of the ring 30. The pair of rings 69 and 79 are interconnected by a spring 80 whose opposed ends are respectively connected with these rings. The projection 77 forms with the projection 78 a coupling which on the one hand will transmit turning of the exposure time setting ring 69 in the direction of the arrow s of FIG. 3 to the aperture setting ring 79 but which at the same time does not prevent independent manual turning, for example, of the ring 79 in the direction of the arrow s beyond the ring 69 without necessarily any turning of the latter while the projection 78 moves beyond and away from the projection 77, so that with this coupling 77, 78 it is possible to automatically as well as manually actuate the aperture setting ring 79. This independent setting of the aperture can be carried out by the manual turning of a hand ring 81 which is accessible to the operator at the front of the camera. This hand ring 81 is part of a cylinder formed with a cutout 82 which terminates at its right end, as viewed in FIG. 3, with an edge 83. This edge 83 of the hand ring 81 is located beyond the projection 77 so as not to interfere with the latter but at the same time engages the projection 78 so as to enable the operator to turn the aperture setting ring 79 by turning the ring 81 while at the same time leaving the exposure time setting ring 69 in whatever angular position it happens to be in. FIG. 3 shows a spring pressed pawl and ratchet teeth on the ring 81 which will maintain the latter in the angular position to which it is turned by the operator. When the shaft 63 is turned by the operator to an angular position which sets the camera for automatic operation a cam carried by the shaft 63 cooperates with the pivotally mounted pawl to move the latter out of the range of the ratchet teeth connected to the ring 81 and a spring connected to the latter will move the ring 81 to an angular position where the aperture setting ring 79 will be operated only automatically.

The parts are illustrated in FIG. 3 in a position they have when the camera is set for automatic operation. With the parts in this position if the arm 33 not shown in FIG. 3 is moved downwardly away from the pin 35 so that the spring 31 can now turn the ring 30 and move the slide 13, this slide 13 will continue to move until the follower 16 engages the pointer 21 in a manner described above and not shown in FIG. 3. As is shown in FIG. 3 the wall 2 carries a projection 88 which in turn carries a stop pin 89 against which the carrier 39' is located by the spring 42. Thus, the turning of the carrier 39' is in this way limited in a clockwise direction as viewed in FIG. 3. When the lighting conditions are unfavorable for an exposure it may be that the slide 13 will stop moving to the left, as viewed in FIG. 3, before the projecting edge 36 of the slide 13 engages with the projection 40 of the carrier 39' and thus in this event the carrier 39' will not even be turned so that the first, red indicator portion 64 will be in register with the aperture 50 so that the operator sees the image of the aperture 50 colored red and knows that an exposure should not be made. Thus, the operator knows that at this time the camera cannot make a proper exposure if set for automatic operation.

If, on the other hand, more light is available then the projecting edge 36 will engage the projection 40 and turn the carrier 39' so as to locate the second indicator portion 65 in register with an unillustrated aperture 50 of FIG. 3 and now the operator will see the image of the aperture 50 colored green and will know that a proper exposure can be made with the camera set for automatic operation. However, where there is a great deal of light available the projecting edge 37 of the slide 13 may encounter the edge 41 of the carrier 39' to turn the latter through a further angle so that the last indicator portion 66, which also may be colored red, comes into register with the aperture 50 and at this time the operator knows that again the lighting conditions are unfavorable for a proper exposure while the camera is set for automatic operation.

If on the other hand with the embodiment of FIG. 3 the shaft 63 is turned by the operator to an angular position which indicates that the camera is set for manual operation, the indicator portion 64 will remain in register with the aperture 50 and the operator will at this time see the image of the aperture 50 colored red in the field of the viewfinder, and the operator will now know that since the camera is set for manual operation it is necessary to manually set the size of the exposure aperture by manually turning the ring 81 so as to turn the aperture setting ring 79.

During such manual turning of the ring 81 so as to cause the edge 83 to engage the projection 78 and turn the aperture setting rings 79 in the direction of the arrow s of FIG. 3, the exposure time setting ring 79 remains stationary. The spring 80 has such a force that it can produce movement of the diaphragm blades with respect to each other but cannot set the mechanism which controls the exposure time. The exposure time setting ring 69 remains at this time connected with the adjusting ring 30 through the projection 67 of the latter and furthermore through the ring 30 the exposure time setting ring is connected to the arm 27 of the control slide 13 so that the ring 69 remains stationary and the carrier 39' does not turn. In other words, at this time the operator has not moved the element 34 down so as to move the arm 33 away from the arm 35 in order to release the adjusting ring 30. Nevertheless the operator can manually set the aperture and make an exposure. Of course the operator knows that at this time the exposure time and exposure aperture settings must be checked manually in order to determine that a proper exposure is made.

With the embodiment of FIG. 3 it is also possible to set the camera for flash operation. In this position the shaft 63 is turned so that the cam 76 acts on the lever 74 to turn the latter and thus cause the lever 74 to act through the projection 73 on the ring 69 so as to automatically set the exposure time at a value suitable for the flash operation. The turning of the ring 69 at this time is such that the pin 71 of the timing mechanism engages the camming edge portion 70b at the end portion of the latter which is adjacent to the camming edge portion 70a which, as was pointed out above, is the B-position where the exposure time is simply determined manually by the operator depending on how long the shutter release plunger is maintained depressed. In other words, when the camera is set for manual operation as is described above the camming edge 70a is in engagement with the pin 71 so that the aperture is set by manual turning of the ring 81 and thus turning of the ring 79 while the exposure time is simply determined manually by the length of time the operator maintains the shutter release plunger depressed. However, when the camera is now set for flash operation the pin 71 will be located at that region of the camming edge portion 70b which is adjacent to the camming edge portion 70a, and in this way the exposure time will be automatically set at a value suitable for flash operation.

Of course, the turning of the ring 69 by the lever 74 at this time so as to locate the left end portion of the camming edge 70b in engagement with the pin 71 will be transmitted through the projection 67 to the ring 30 which will also turn, but the angle through which the ring 30 is turned at this time is too small to bring the projecting edge 36 of the slide 13 into engagement with the projection 40 of the carrier 39' which at this time is maintained in engagement with the stop pin 89 by the spring 42, so that at this time the indicator portion 64 remains in register with the aperture 50 and the operator will see the image of the aperture 50 colored red and will know that since the camera is set for flash operation it is necessary only to manually set the exposure aperture at this time by manual turning of the ring 81. The structure is also so designed that this small shifting of the slide 13 to the left to locate the left end of the edge portion 70b in engagement with the pin 71 will result in turning of the follower 16 through engagement of the projection 14 with the pin 15 through an angle too small to locate the outer tip of the follower 16 in the range through which the pointer 21 moves when it is in the region of the gap 22, so that at this time there is no possibility of engagement of the follower 16 with the pointer 21. If desired, a suitable stop may be provided on the plate 17 to limit the turning of the follower 16 by the spring 85 and in the rest position of the slide 13 where the ends 11a and 12a of the slots 11 and 12 respectively engage the pins 9 and 10 there may be a sufficient distance between the ends 14 of the slide 13 and the pin 15 to enable the slide 13 to move through the distance required to place the left end of edge 70b in engagement with pin 71 without engagement of the end 14 of the slide 13 with the pin 15 so that the follower 16 will not move at this time.

When the camera is set for automatic operation the same exposure time as that which is provided for flash operation is obtained when the slide 13 has moved through such a distance that the projecting edge 36 has engaged the projection 40 to turn the carrier 39' so as to located the indicator portion 65 in register with the aperture 50 and at the same time to locate the right end portion of edge 70b, which is to say that the portion of this edge 70b which is adjacent to the camming edge portion 70c, in engagement with the pin 71. Because of the fact that the camming edge portion 70b extends along the circle whose center is in the optical axis the exposure time will remain unchanged and thus when set for automatic operation the same exposure time which is used for flash operation can be provided with the indicator portion 65 in register with the aperture 50 to indicate to the operator that a proper exposure can be made.

The above-described exposure time setting and aperture setting structure illustrated in FIG. 3 is also included in the embodiment of FIG. 1 for setting the exposure factors of the camera in response to turning of the ring 30. As is apparent from the above description, the particular camera disclosed is that type which, when operated automatically, simultaneously sets both the exposure time and the aperture.

It will be noted that with the structure of the invention the light-responsive means and the indicator means are entirely separate assemblies separated from each other so that it is possible to locate the light-responsive means at the best possible location which is, for example, with the upper right end of the camera as viewed in FIG. 1, with the axis of the galvanometer 5 extending vertically, while the indicator means is located at the upper central portion of the camera, approximately. This is possible because with the structure of the invention the control slide 13 is provided to transmit movement from the light-responsive means to the indicator means, and of course this control slide 13 performs through its arm 27 the additional function of cooperating with the ring 30 for providing automatic setting of the camera.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; control means supported for movement by said support means and controlling at least part of the structure of the camera which determines the extent of exposure of film therein; light-responsive means including blocking means movable in accordance with variations of lighting conditions to which said light-responsive means is exposed and adapted to mechanically engage said control means for limiting the movement thereof to a distance determined by said variations of the lighting conditions; and indicator means supported for movement by said support means and located in the path of movement of said control means to be moved by the latter to a position indicating to the operator whether or not the lighting conditions are favorable for an exposure.

2. In a camera, in combination, support means; a control slide supported by said support means for shifting movement in a given direction; a light meter carried by said support means and responsive to the amount of light prevailing in the neighbourhood of the camera, said light meter having a pointer which assumes an angular position indicative of the lighting conditions; clamping means carried by said support means for clamping and holding the pointer in a given angular position just prior to making an exposure; moving means carried by said support means and cooperating with the clamped pointer and said control slide for moving the latter in said direction through a distance determined by the angular position of the clamped pointer; indicator means movably carried by said support means in the path of movement of said control slide in said direction to be moved by the latter to a position indicating to the operator whether or not conditions are favorable for an exposure, said indicator means having a rest position indicating to the operator that insufficient light is available for a proper exposure; and means for setting the exposure time and exposure aperture of the camera, said latter means being operatively connected to said control slide to be automatically actuated thereby for setting the exposure time and exposure aperture of the camera in accordance with the distance through which said control slide is moved by said moving means.

3. In a camera, in combination, support means; a control slide supported by said support means for shifting movement in a given direction; a light meter carried by said support means and responsive to the amount of light prevailing in the neighbourhood of the camera, said light meter having a pointer which assumes an angular position indicative of the lighting conditions; clamping means carried by said support means for clamping and holding the pointer in a given angular position just prior to making an exposure, moving means carried by said support means and cooperating with the clamped pointer and said control slide for moving the latter in said direction through a distance determined by the angular position of the clamped pointer; indicator means moveably carried by said support means in the path of movement of said control slide in said direction to be moved by the latter to a position indicating to the operator whether or not conditions are favourable for an exposure, said indicator means having a rest position indicating to the operator that insufficient light is available for a proper exposure; and means for setting the exposure time and exposure aperture of the camera, said latter means being operatively connected to said control slide to be automatically actuated thereby for setting the exposure time and exposure aperture of the camera in accordance with the distance through which said control slide is moved by said moving means, said moving means including a spring means cooperating with the control slide to move the latter in said direction and a follower connected with the control slide to be moved thereby and following and engaging the pointer to be stopped by the latter according to the angular position thereof so as to limit the extent to which the control slide is moved in said direction by said spring means.

4. In a camera, in combination, support means; a control slide supported by said support means for shifting movement in a given direction; light-responsive means cooperating with said control slide for shifting the latter in said direction through a distance determined by the amount of light received by said light-responsive means; indicator means supported for movement by said support means and located in the path of movement of said slide to be moved by the latter to a position indicating to the operator of the camera whether or not the lighting conditions are favourable for an exposure; manually operable setting means carried by said support means for optionally setting the camera for automatic or manual operation; and motion transmitting means carried by said support means and actuated by said setting means and cooperating with said indicator means for moving the latter to a position indicating that the camera is set for hand operation when the setting means is set by the operator to a position setting the camera for manual operation.

5. In a camera, in combination, support means; a control slide supported by said support means for shifting movement in a given direction; light-responsive means cooperating with said control slide for shifting the latter in said direction through a distance determined by the amount of light received by said light-responsive means; indicator means supported for movement by said support means and located in the path of movement of said slide to be moved by the latter to a position indicating to the operator of the camera whether or not the lighting conditions are favourable for an exposure; manually operable setting means carried by said support means for optionally setting the camera for automatic or manual operation; and motion transmitting means carried by said support means and actuated by said setting means and cooperating with said indicator means for moving the latter to a position indicating that the camera is set for hand operation when the setting means is set by the operator to a position setting the camera for manual operation, said manually operable setting means including a rotary cam and said motion transmitting means including a lever turnably carried by said support means and having an angular position determined by the angular position of said cam.

6. In a camera, in combination, support means; a control slide supported by said support means for shifting movement in a given direction; light-responsive means cooperating with said control slide for shifting the latter in said direction through a distance determined by the amount of light received by said light-responsive means; indicator means supported for movement by said support means and located in the path of movement of said slide to be moved by the latter to a position indicating to the operator of the camera whether or not the lighting conditions are favourable for an exposure; means carried by the camera for setting an exposure factor which determines the exposure of the film at least in part; motion transmitting means actuated by said slide and cooperating with said means for setting said exposure factor to set the latter automatically in response to movement of said slide; and coupling means coupling said means for setting the exposure factor to said motion transmitting means to be moved by the latter while at the same time freeing said means for setting said exposure factor for manual operation at any time.

7. In a camera, in combination, support means; a control slide shiftably carried by said support means for movement in a given direction; light-responsive means cooperating with said control slide for moving the latter in said direction through a distance corresponding to the amount of light received by said light-responsive means; exposure time setting means movably carried by said support means and operatively connected with said slide to be moved by the latter; aperture setting means movably carried by the camera; coupling means coupling said exposure time setting means to said aperture setting means for automatically setting the latter while at the same time freeing said aperture setting means for manual setting by the operator of the camera; and manually operable means cooperating with said exposure time setting means for setting the latter at a selected one of a pair of positions at which the exposure time is constant, one of said positions being a position suitable for flash operation of the camera.

8. In a camera, in combination, support means; a control slide shiftably carried by said support means for movement in a given direction; light-responsive means cooperating with said control slide for moving the latter in said direction through a distance corresponding to the amount of light received by said light-responsive means; exposure time setting means moveably carried by said support means and operatively connected with said slide to be moved by the latter; aperture setting means moveably carried by the camera; coupling means coupling said exposure time setting means to said aperture setting means for automatically setting the latter while at the same time freeing said aperture setting means for manual setting by the operator of the camera; and manually operable means cooperating with said exposure time setting means for setting the latter at a selected one of a pair of positions at which the exposure time is constant, one of said positions being a position suitable for flash operation of the camera, and the other of said positions being a hand operating position where the exposure time setting means provides the same exposure time as for flash operation while said coupling means frees said aperture setting means for manual setting.

9. In a camera, in combination, support means; a control slide shiftably carried by said support means for movement in a given direction; light-responsive means cooperating with said control slide for moving the latter in said direction through a distance corresponding to the amount of light received by said light-responsive means; exposure time setting means moveably carried by said support means and operatively connected with said slide to be moved by the latter; aperture setting means moveably carried by the camera; coupling means coupling said exposure time setting means to said aperture setting means for automatically setting the latter while at the same time freeing said aperture setting means for manual setting by the operator of the camera; and manually operable means cooperating with said exposure time setting means for setting the latter at a selected one of a pair of positions at which the exposure time is constant, one of said positions being a position suitable for flash operation of the camera, said exposure time setting means including a ring turnable about the optical axis of the camera and having a camming edge cooperating with a follower pin of a timing mechanism, and said camming edge having a portion extending along an arc of a circle whose center is in said optical axis so that when said pin engages said portion of said camming edge the exposure time will remain unchanged.

10. In a camera, in combination, support means; control means supported for movement by said support means and controlling at least part of the structure of the camera which determines the extent of exposure of film therein, said control means providing proper exposures for film of a given speed as long as said control means moves within a predetermined range of movement; light-responsive means including blocking means movable in accordance with variations of lighting conditions to which said light-responsive means is exposed and adapted to mechanically engage said control means for limiting the movement thereof to a distance determined by said variations of the lighting conditions; and indicator means supported for movement by said support means and located in the path of movement of said control means to be moved thereby, said indicator means indicating to the operator that a proper exposure can be made as long as said control means remains within said range of movement and said indicator means indicating at least when said control means reaches one end of said range of movement that a proper exposure cannot be made.

11. In a camera, in combination, support means; control means supported for movement by said support means and controlling at least part of the structure of the camera which determines the extent of exposure of film therein; light-responsive means including blocking means movable in accordance with variations of lighting conditions to which said light-responsive means is exposed and adapted to mechanically engage said control means for limiting the movement thereof to a distance determined by said variations of the lighting conditions; and indicator means supported for movement by said support means, said indicator means being entirely separate from and spaced from said light-responsive means and being located in the path of movement of said control means to be moved by the latter to a position indicating to the operator whether or not the lighting conditions are favorable for an exposure.

12. In a camera, in combination, support means; a control slide shiftably carried by said support means for movement in a given direction; light-responsive means cooperating with said slide for moving the latter in said direction through a distance determined by the amount of light received by said light-responsive means; and indicator means pivotally carried by said support means and located in the path of movement of said control slide in said direction to be moved by the latter through an angle which will indicate to the operator whether or not the light conditions are favourable for an exposure, said control slide having an elongated portion longitudinally moveable in said direction and provided with a pair of projecting edges extending transversely of said direction of movement of said control slide and displaced both longitudinally and laterally with respect to each other on said longitudinal elongated portion of said control slide, and said indicator means being turnable about an axis also extending transversely with respect to said direction of movement and including a pair of edge portions respectively located at the paths of movement of said projected edges of said control slide to be successively engaged by said projecting edges.

13. In a camera, in combination, support means; control means supported for movement by said support means and controlling at least part of the structure of the camera which determines the extent of exposure of film therein, said control means providing for film of a given speed proper exposures as long as said control means remains within a predetermined range of movement; light-responsive means including blocking means movable in accordance with variations of lighting conditions to which said light-responsive means is exposed and adapted to mechanically engage said control means for limiting the movement thereof to a distance which is determined by said variations of the lighting conditions; and indicator means supported for movement by said support means and located in the path of movement of said control means to be moved by the latter, said indicator means indicating that conditions are favorable for an exposure as long as said control means remains within said predetermined range of movement, and said indicator means indicating that conditions are unfavorable for an exposure when said control means reaches the ends of said range of movement.

14. In a camera, in combination, support means; a control slide supported by said support means for shifting movement in a given direction; light-responsive means cooperating with said control slide for shifting the latter in said direction through a distance determined by the amount of light received by said light-responsive means; and indicator means supported for movement by said support means and located in the path of movement of said slide to be moved by the latter to a position indicating to the operator of the camera whether or not the lighting conditions are favourable for an exposure, said light-responsive means including a light meter having a pointer turnable to an angular position indicative of the lighting conditions, and a clamp for said pointer, said clamp having a stationary jaw and a moveable jaw, one of said jaws having a series of teeth and a pair of teeth at each end of the series being spaced from each other by a distance greater than the distance between the remaining teeth of the series.

15. Light measuring apparatus comprising, in combination, a light meter having a pointer turnable along a given circle; and clamp means cooperating with said pointer for releasably clamping the latter at a given position along said circle, said clamp means including a pair of jaws one of which is stationary and the other of which is moveable and at least one of said jaws having a series of teeth each of which has on at least one side an edge extending perpendicularly with respect to the tangent of said circle at the intersection thereof with said edge, said pointer at its portion which is clamped by said clamping means having a circular cross-section of a given diameter and each tooth having a height from its outer tip to its root which is greater than one-half of said diameter but less than said diameter.

References Cited in the file of this patent

UNITED STATES PATENTS

| | | |
|---|---|---|
| 2,058,532 | Tuttle | Oct. 27, 1936 |
| 2,206,626 | Blechner | July 2, 1940 |
| 2,213,742 | Mihalyi | Sept. 3, 1940 |
| 2,242,043 | Sanger | May 13, 1941 |
| 2,250,898 | Tonnies | July 29, 1941 |
| 2,373,391 | Green | Apr. 10, 1945 |
| 2,868,095 | Gebele | Jan. 13, 1959 |
| 2,925,760 | Broschke | Feb. 23, 1960 |
| 2,933,991 | Sauer | Apr. 26, 1960 |